Dec. 17, 1968  C. L. DAVIS  3,416,708
WEIGHING AND DISPENSING APPARATUS
Filed April 18, 1967  2 Sheets-Sheet 1

INVENTOR.
CAREY L. DAVIS
BY Newton, Hopkins,
Jones & Ormsby
ATTORNEYS

Dec. 17, 1968   C. L. DAVIS   3,416,708
WEIGHING AND DISPENSING APPARATUS
Filed April 18, 1967   2 Sheets-Sheet 2

INVENTOR.
CAREY L. DAVIS
BY Newton, Hopkins,
Jones & Ormsby
ATTORNEYS

United States Patent Office 3,416,708
Patented Dec. 17, 1968

3,416,708
WEIGHING AND DISPENSING APPARATUS
Carey L. Davis, Atlanta, Ga., assignor of twenty percent to William B. Prichett, Jr., Stone Mountain, and Berthold G. Stumberg, Jr., George M. Eubanks, and Richard N. Lester, all of Atlanta, Ga.
Filed Apr. 18, 1967, Ser. No. 631,649
14 Claims. (Cl. 222—55)

ABSTRACT OF THE DISCLOSURE

Weighing and dispensing apparatus for speedily dispensing an accurately weighed amount of substance, such as grain, or the like, comprising a three section rotatable hopper movably supported by an arm balanced by a weight. A feed hopper is positioned above the rotatable hopper to feed substance into the rotatable hopper. When a section of the rotatable hopper is filled with grain to the prescribed weight, communication between the feed hopper and the rotatable hopper is interrupted and the weight of the grain in the rotatable hopper causes the rotatable hopper to rotate and dispense the grain therein.

Background of the invention

In packaging grainy or fine substances, such as grain, sugar, fertilizer, or any free-flowing substance composed of relatively small particles, it is desirable to automatically weigh and dispense a predetermined quantity of the grain as speedily as possible into a package. In the past, the apparatus utilized to perform this function was cumbersome, expensive to manufacture, and required close attention by a skilled operator when in use. Of course, these factors caused the substance dispensed by the weighing and dispensing apparatus to be expensive because of the packaging costs.

Summary of the invention

This invention comprises weighing and dispensing apparatus which includes a rotatable hopper divided into equal sections and weighing means connected to the rotatable hopper to determine the weight of the hopper and the substance placed therein. After the quantity of the substance placed in the hopper reaches a predetermined weight, the weighing means allows the rotatable hopper to rotate and dump the substance from the portion of the hopper in which it was weighed, toward an outlet duct, while simultaneously moving another portion of the rotatable hopper into the weighing position so that another quantity of substance can be placed therein and weighed.

Accordingly, it is an object of this invention to provide apparatus for speedily weighing and dispensing a predetermined amount of a grainy or fine substance from a larger quantity of said substance.

Another object of this invention is to provide apparatus for weighing and dispensing a predetermined amount of free-flowing material wherein the material is placed into a rotatable hopper connected to a weighing mechanism without causing the hopper to shift the weighing mechanism until a predetermined amount of the material is contained in the hopper.

Another object of this invention is to provide a funnel shaped hopper for feeding material toward a weighing and dispensing apparatus, whereby the material is fed through the funnel shaped hopper at a maximum velocity but with little inertia effect on the feeding and dispensing apparatus.

Another object of this invention is to provide apparatus for feeding a granular substance into a bag wherein the air present in the bag is moved back through the apparatus to reduce the dust created at the site of the bag.

Another object of this invention is to provide a feeding and dispensing apparatus that functions automatically, that has a minimum number of moving parts, in which the construction is uncomplicated, and which is well designed to meet the economics of manufacture.

Other objects, features and advantages of the present invention will become apparent upon reading the following disclosure when taken in conjunction with the accompanying drawing.

Description of the embodiment

Figure 1:
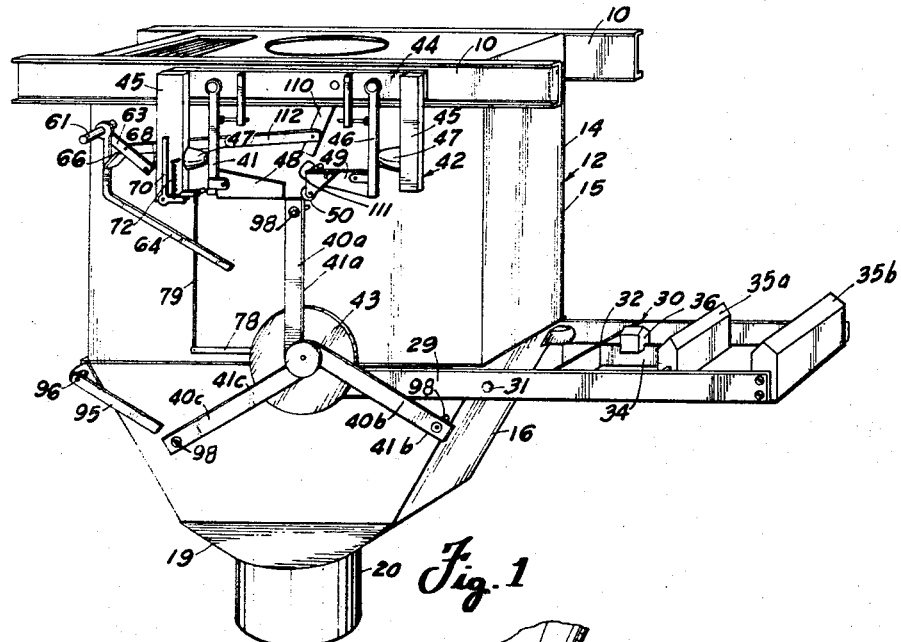
FIG. 1 is a perspective view of the weighing and dispensing apparatus.

Referring now more particularly to the drawing, in which like numerals indicate like parts throughout the several views, FIG. 1 shows a pair of horizontal support beams 10 suspended a distance from the floor or ceiling by vertical support beams (not shown) in the conventional manner. The support beam 10 supports the weighing and dispensing apparatus 12 in such a manner that it is displaced from the floor or ground level a distance sufficient to operate a conveyor line, bag placer, sewing machine and related machinery therebelow. The weighing and dispensing apparatus 12 comprises an outer casing 14 that is suspended from the support beam 10. The outer casing 14 has an upper rectangular section 15 and a depending lower section 16. The lower section 16 is generally rectangular in horizontal cross section in the area immediately below the upper rectangular section 15, and converges in its lower portion 19, in a funnel shape, so that it terminates in a cylindrical section 20.

Figure 2:
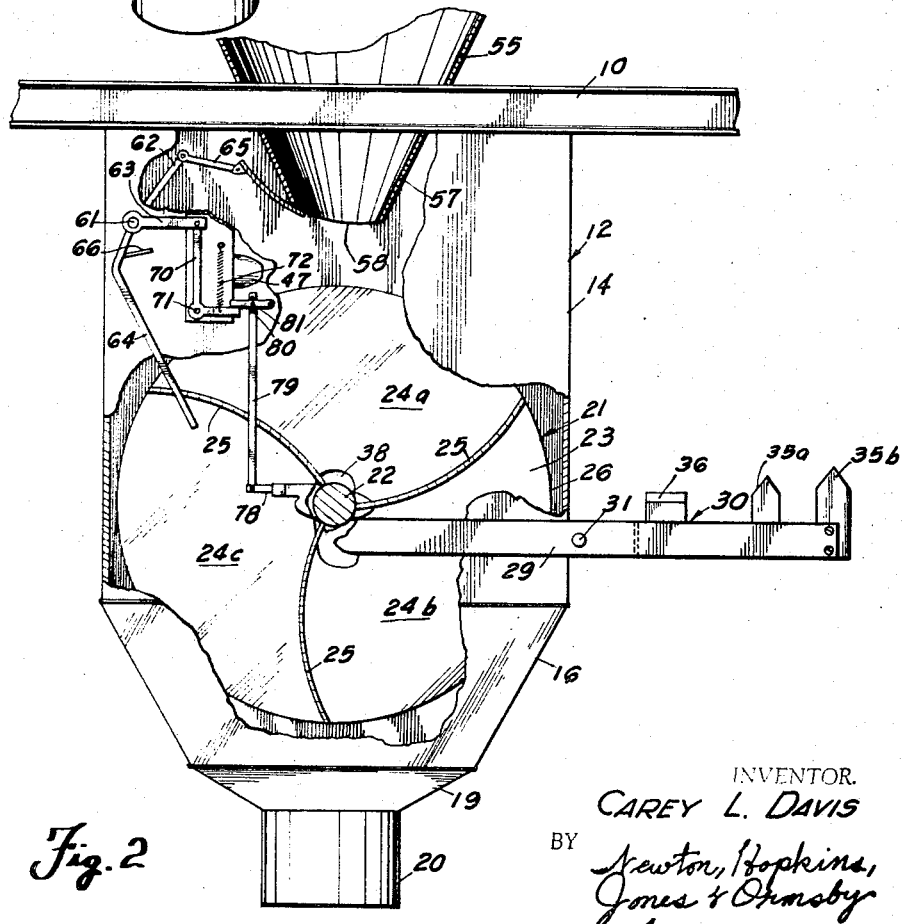
FIG. 2 is a front elevational view of the weighing and dispensing apparatus, with portions of the housing and the front wall of rotatable hopper removed.

As is best shown in FIG. 2, the outer casing 14 houses a rotatable hopper 21 which is rotatable about axle 22. Rotatable hopper 21 comprises a pair of vertically extending laterally spaced circular side walls 23 and is divided into three sections, sections 24a, 24b and 24c. The sections 24a–c are divided from one another by walls 25 which extend generally radially outwardly from the axle 22 toward the periphery 26 of the rotatable hopper 21. The walls 25 are curved or bowed so that their center portion is bent toward the clockwise direction of the hopper 21, as is shown in FIG. 2.

The axle 22 of the rotatable hopper 21 is received in hopper bearing 28, and the axle 22 is supported by balance arms or lever arms 29 of a weighing mechanism 30. The balance arms 29 are pivoted on balance arm pins 31 or similar balancing support means. Pins 31 are supported by outer casing 14 and extend in a horizontal plane parallel to and below the horizontal plane in which axle 22 of rotatable hopper 21 extends. The balance arms 29 extend from each end of the axle 22, on both sides of the rotatable hopper 21, and are joined together by laterally extending ribs 32 and 33, and sliding weight support arm 34 extends between ribs 32 and 33. Rib 33 is utilized to support stationary weights 35a, and weights 35b are bolted to balance arms 29. Support arm 34 is utilized to support sliding weights 36 to balance the weight of the rotatable hopper 21 about balance arm pin 31.

Figure 4:
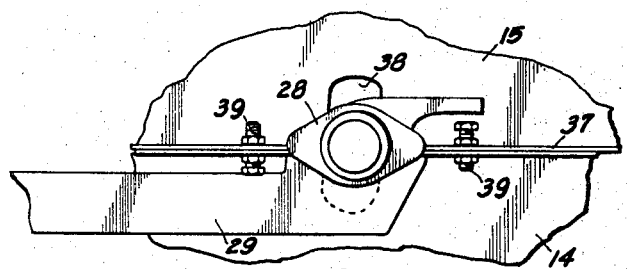
FIG. 4 is a partial view of the rear of the housing showing the balancing arms.
Figure 5:
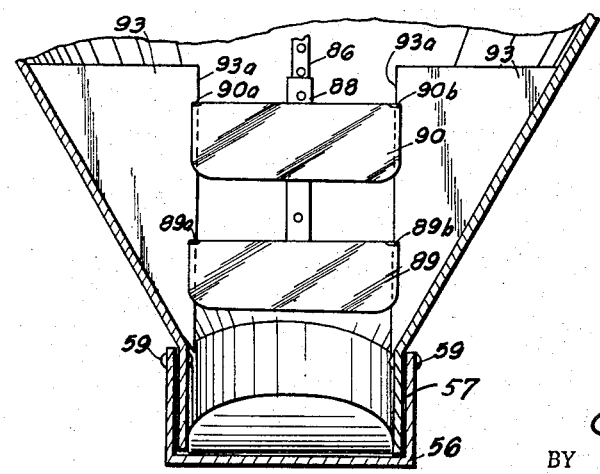
FIG. 5 is a partial side elevational view of the feeder hopper.

As is shown in FIG. 4, the upper rectangular section 15 and lower section 16 of outer casing 14 are joined together by an externally extending seam 37 and axle 22 extends through slot 38 defined in outer casing 14. The vertical movement of balance arm 29 and rotatable hopper 21 is limited by limiting screws 39 extending through seam 37.

The rotatable hopper 21 has a plurality of positioning arms 40a, 40b and 40c connected thereto by means of connecting plate 43, which extend generally radially outwardly of the axle 22, and are disposed at equal angles circumferentially about the rotatable hopper 21, externally of outer casing 14. Positioning arms 40a–c are located so that their clockwise facing surfaces 41a, 41b and 41c extend directly radially outwardly of the center of the axle 22, and each surface 41a–c bisects the angle formed between the walls 25 of the corresponding hopper sections 24a–c.

Stop mechanism 42 is connected to outer casing 14 and includes horizontally extending support bar 44 with downwardly extending bumper bars 45. Bumper links 46 are pivotally connected at their upper ends to support bar 44, inwardly of bumper bars 45. Rubber cushions 47 are connected to bumper bars 45 and extend toward bumper links 46. Horizontally extending stop levers 48 and 49 are pivotally connected at their outer ends to bumper links 45 in such a manner that they are free to pivot in an upward direction about bumper links 46 but are prevented from pivoting below a generally horizontal position. Stop lever 49 supports at its free end a roller 50 which is maintained slightly above the circle described by the ends of the rotating positioning arms 40a–c when hopper 23 and its contents weigh more than weights 35 and 36, and within the circle when weights 35 and 36 weigh more than hopper 23 and its contents. Stop lever 48 is maintained with its free end projecting into the circle described by the ends of rotating positioning arms 40a–c when hopper 23 is either in a loaded or unloaded condition. As the rotatable hopper 21 rotates at a rather high rate of angular velocity, the positioning arms 40a–c vigorously urge the stop lever 49 toward the right, as shown in FIG. 1, so that stop lever 49 and its bumper link 46 tend to pivot about support bar 44 and depress its cushion 47. Of course, the cushion decelerates the rotatable hopper 21. After the hopper 21 comes to a full stop, the spring in the cushion 47 urges the positioning arm, for instance positioning arm 40a, back toward stop lever 48 to the position where its side 41a extends vertically of the axle 22, thereby positioning the section 24a in the upper portion of the outer casing 14.

Stop lever 48, being pivotal about its bumper link 46, acts as a ratchet with respect to the positioning arm 40a, so that the movement of the positioning arm pivots stop lever 48 upwardly, or in a counterclockwise direction about its bumper link 46, when rotating in a clockwise direction. After the positioning arm 40a passes the free end of stop lever 48, stop lever 48 drops into the position as shown in FIG. 2, so as to prevent the positioning arm from rotating in a counterclockwise direction. Stop lever 48 helps to accurately position the positioning arm 40a so that its side 41a extends exactly vertically of the axle 22.

Figure 3:
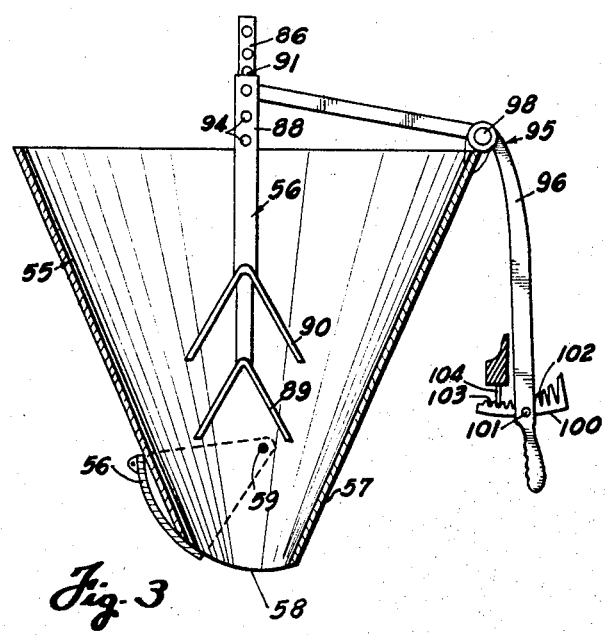
FIG. 3 is an elevational view, with parts broken away, of the feeder hopper.

Mounted above the rotatable hopper 21 and supported from support beam 10 is feeder hopper 55 and feeder valve or choke 56. The feeder hopper 55 is inwardly tapered toward its lower portion and terminates in a cylindrical portion 57 defining a bottom opening 58 which is located directly above the axle 22 of the rotatable hopper 21. The feeder valve 56 is pivotal about pivot pins 59 which are offset from the center of the feeder hopper 55. The feeder valve 56 is constructed so that it rotates in a clockwise direction to uncover the opening 58, to the side of the feeder hopper 55 remote from the pivot pins 59. With this construction, the weight of the feeder valve 56 is always so that it tends to close the valve over the opening 58. The opening 58 of the feeder hopper 55 is slanted, as is shown in FIG. 3, so that the feeder valve 56 forms a tight closure thereabout when in its closed position.

Referring again to FIG. 2, a shaft 61 is rotatably supported in the upper portion 15 of casing 14 and extends substantially parallel to the axle 22 of the rotatable hopper 21. Shaft 61 has rigidly connected thereto valve connecting lever 62, and holding lever 63, so that rotation of one of the levers through an arc causes the other lever to rotate through an arc of equal degrees. Actuating lever 64 is loosely connected to shaft 61 and functions to engage holding lever 63 by means of projection 66. Valve connecting lever 62 is connected to the feeder valve 56 through means of a link 65. Link 65 is connected to the outer poriton of the feeder valve 56 so that rotation of shaft 61 in a counterclockwise direction pivots the valve connecting lever 62 in a similar direction which moves link 65 around the shaft 61 and causes the feeder valve 56 to pivot about its pivot pin 59. Movement of the feeder valve 56 in this direction causes it to uncover the opening 58 of the feeder hopper 55.

L-shaped catch lever 70 is connected to the outer casing 14 by means of a pivot pin 71 and biased in a counterclockwise direction (FIGS. 1 and 2) by means of tension spring 72 into engagement with holding lever 63. When the shaft 61 rotates in a counterclockwise direction to open feeder valve 56, projection 68 of holding lever 63 will move up the vertical portion of the catch lever 70, which pivots about its pivot pin 71, until projection 68 clears the top portion of catch lever 70, whereupon spring 72 moves catch lever 70 beneath the projection 68. This holds holding lever 63 in the positioning as shown in FIG. 2 so that shaft 61 cannot move in a clockwise direction. Of course, this also holds feeder valve 56 in its open position.

Actuating lever 64 projects outwardly from the shaft 61 toward the rotatable hopper 21 and positioning arms 40a–c support rollers 76 inwardly thereof. Rollers 76 extend into the plane of positioning arms 40a–c. Thus, when rotatable hopper 21 rotates in a clockwise direction, rollers 76 sequentially engage actuating lever 64 so that actuating lever 64 is moved in a counterclockwise direction about its shaft 61. Of course, when rollers 76 clear actuating lever 64, actuating lever 64 is free to return to its original position.

The front arm of balance arm 29 of the weighing mechanism 30 extends beyond axle 22 of hopper 23 from pivot pin 31 to form an extension 78. An upwardly extending linkage 79 is connected to the end of the extension 78, and defines an elongated aperture or slot 80 therein at its end remote from the extension 78. A pin 81 is connected to the horizontally extending leg of L-shaped catch lever 70 at a point removed from pivot pin 71. The pin 81 extends through the elongated slot 80 of the upwardly extending link 79 so that catch lever 70 is free to pivot about its pivot pin 71 a limited distance before the projection 81 reaches the limits of the elongated slot 80.

As is shown in FIG. 1, stop lever hold down link 110 is pivotally connected at its upper end to support bar 44 and its lower end is positioned behind stop lever 49. Pin 111 is welded to and extends behind stop lever 49 to a position below hold down link 110. Connecting link 112 is connected at one of its ends to hold down link 110 and at the other of its ends to holding lever 63. Thus, during movement of holding lever 63 from the valve closed position to the valve open poistion, hold down link 110 is moved over pin 111 to prevent stop lever 49 from inadvertently pivoting about bumper link 46 when roller 50 is engraved by one of the positioning arms 40a–c. When holding lever 63 is moved from the valve open position to the valve closed position, hold down link 110 is moved away from pin 111, thereby freeing stop lever 49 to pivot about bumper link 46. Thus, when hopper 21 is filled and ready to rotate, stop lever 49 will be lifted slightly by the passage of the end of one of positioning arms 40a–c around the bottom arcuate surface of roller 50.

As is best shown in FIG. 3, the feeder valve or choke 56 regulates the flow of grain through feeder hopper 55 and comprises a pair of telescoping tubes 86 and 88 of rectangular cross section. Tubes 86 and 88 terminate in outwardly tapered wings 89 and 90 which are disposed in the proximity of the opening 58 of the feeder hopper 55. A pair of triangular shaped guides 93 are attached to opposite sides of the inside surface of feeder hopper 55 and extend toward wings 89 and 90. A vertical edge 93a of each guide is received in slots 89a and 89b, and 90a and 90b of wings 89 and 90, respectively, to prevent lateral movement of the wings 89 and 90 during operation of the apparatus. The inner tube 86 is adjustably positioned within the outer tube 88 by means of a pin 91 extending through any one of the apertures 92 of the inner tube 86, so that the pin 91 rests on the upper extremity of the outer tube 88. The outer tube 88 is apertured at 94, along its length, and an adjusting mechanism is connetced thereto. The adjusting mechanism 95 comprises an L-shaped lever 96 having its horizontal portion connected to the apertures 94 of the outer tube 88 and its vertical portion extending downwardly therefrom. The lever 96 is pivotal about pivot pin 98 at the intersection of its horizontal and vertical portions so that movement of the vertical portion of the lever causes the horizontal portion to move upwardly or downwardly with respect to the feeder hopper 55.

A positioning means 100 is pivotally connected at 101 to the lever 96, at its lower end. The positioning means is spring-biased by means of spring 102 in a clockwise direction so that a serrated portion 103 thereof engages a stop projection 104. With this construction, when the positioning means 100 is biased by its spring 102 in the position as shown in FIG. 3, the lever 96 will be maintained in its present position. When the positioning mechanism is moved against the bias of its spring 102 so that the lever 96 can be pivoted around its pivot pin 98, the choking mechanism 85 can be moved upwardly or downwardly within the feeder hopper 55.

The outwardly tapered wing portions 89 and 90 of the telescoping tubes 86 and 88 cooperate with the converging walls of the feeder hopper 55 to choke the opening 58. If the weighing and dispensing apparatus 12 is to be utilized to dispense a relatively fine grain, the operator will remove the pin 91 (FIG. 3) of the choking mechanism 85 and lower the inner tube 86 so that its outwardly tapered portion 89 comes into closer proximity with the opening 58 of the feeder hopper 55. Pin 91 is then replaced in an appropriate hole in tube 86 so that it rests against the upper extremity of the outer tube 88. Of course, when it is desired to dispense a larger size grain, the reverse of this procedure should be performed.

It should be noted that the outer tapered wing portions 89 and 90 of the telescoping tubes 86 and 88 define with the converging side walls of the feeder hopper 55 narrow spaces between the tubes 86 and 88 and feeder hopper 55 above the opening 58 of the feeder hopper. The fact that the walls of the feeder hopper 55 and the tapered wing portions of the telescoping tubes 86 and 88 extend toward each other causes a substantial portion of the weight of the grain within the feeder hopper to rest on these portions, as opposed to resting directly on the feeder valve 56, when in its closed position. Thus, when the feeder valve 56 is in its closed position, and the flow of grain through the feeder hopper 55 has terminated, a portion of the grain below the inner tube 86 and above the feeder valve 56 will rest substantially completely on feeder valve 56; however, the grain above the lowermost portion of the outwardly tapered wing portion 89 of the inner tube 86 will tend to bridge across from the wing portion 89 of inner tube 86 to the converging side walls of the feeder hopper 55. Thus, the bridging of the grain in this area keeps the grain from converging on and resting on feeder valve 56. Of course, the same is true of the wing portion 90 of the outer tube 88 and the converging walls of feeder hopper 55. With this construction, when feeder valve 56 is moved to its open position as shown in FIG. 3, only the grain resting on feeder valve 56 will move as a body and drop toward rotatable hopper 21. The remaining grain which is partially bridged across from the wing portions 89 and 90 of the telescoping tubes 86 and 88 to the inwardly tapered walls of feeder hopper 55 will begin to flow downwardly in and then outwardly of feeder hopper 55 toward rotatable hopper 21.

Because of the function of telescoping tubes 86 and 88, the grain in feeder hopper 55 will not surge toward the rotatable hopper 21 to tilt the weighing mechanism 30 prematurely. Furthermore, the double bridging effect of the telescoping tubes 86 and 88 tends to build two "bridges" within the feeder hopper as the grain flows therethrough to slot the feeding of the grain. However, the space between telescoping tubes 86 and 88 and the converging sides of the feeder hopper 55 extends the entire length and width around the tubes 86 and 88 so that a rectangular opening is formed within the feeder hopper 55, just inwardly of the opening 58 thereof. The opening formed in this manner creates a large flow area for the grain as it passes through the feeder hopper 55 so that ample passage is maintained for the grain as it flows toward the rotatable hopper 21.

If the operator of the weighing and dispensing apparatus desires to change the speed of the flow of grain through the feeder hopper, he merely disengages the positioning mechanism 100 of the adjusting mechanism 95 to move the choking mechanism 86 further toward the opening 58 of feeder hopper 55 or further away therefrom, to create a smaller or larger opening between the outwardly tapered portions 89 and 90 of telescoping tubes 86 and 88 and the converging walls of feeder hopper 55.

Hand lever 95 is pivotally connected by pivot pin 96 to outer casing 12 and includes a handle portion (not shown) and a projection 98 which is pivotal to a position where it lies in the path of positioning arms 40a–c. When projection 98 engages one of the positioning arms 40a–c, rotatable hopper 23 will be prevented from rotating.

*Operation*

When the feeder hopper 55 has been filled with grain and it is desired to weigh and dispense predetermined weights of grain, the operator merely retracts hand lever 95 from engagement with one of the positioning arms 40a–c and moves actuating lever 64 in a counterclockwise direction so that its projection 66 abuts holding lever 63 to rotate shaft 61. When holding lever 63 rotates to the position as shown in FIG. 2 where its projection 68 clears catch lever 70, spring 72 biases catch lever 70 to the position as shown in FIG. 2, whereupon shaft 61 is unable to rotate in a clockwise direction. As shaft 61 is rotated in the counterclockwise direction, valve connecting lever 62 is rotated to the position shown in FIG. 2, thereby opening feeder valve 56 of the feeder hopper 55 through link 65. At this point, the grain from feeder hopper 55 begins to flow into section 24a of rotatable feeder hopper 21. As section 24a of rotatable feeder hopper 21 begins to fill with grain, rotatable feeder hopper 21 increases in weight until balancing arm 29 of weighing mechanism 30 pivots about its pivot pin 31 to allow the rotatable hopper 21 to move in a downward direction. This causes positioning arm 40a to move down with rotatable hopper 21 to clear, or at least partially clear roller 50 of stop lever 49, whereupon rotatable hopper 21 is free to rotate in a clockwise direction. While the section 24a is precisely positioned beneath feeder hopper 55 so that the angle formed between walls 25 of section 24a is bisected by a vertical plane extending through axle 22, the walls 25 are concave; that is the center portions of walls 25 are bent so that they project in a clockwise direction around the rotatable hopper 21. Thus, when section 24a of rotatable hopper 21 fills with grain, section 24a will contain more grain on concave wall 25 (to the right side of FIG. 2) than it will on the convex wall 25 (on the left side of FIG. 2). Thus, rotatable hopper 21 will tend to rotate in a clockwise direction about axle 22.

When balance arm 29 of weighing mechanism 30 shifts to move positioning arm 40a beneath the roller 50 of stop lever 49, extension 78 of balance arm 29 also moves downwardly, about pivot pin 31, to move upwardly extending link 79 downwardly, whereupon slot 80 moves projection 81 of catch lever 70 downwardly, to pivot catch lever 70 about its pivot pin 71 so that catch lever 70 is moved from under projection 68 of holding lever 64. The weight of levers 62 and 63, and the weight of valve 56 tend to pivot shaft 61 in a clockwise direction so that valve connecting lever 62, and holding lever 63, both being rigidly connected to rotatable shaft 61, pivot with shaft 61, in a clockwise direction. Thus, feeder valve 56 is moved to its closed position upon the initial movement of rotatable hopper 21 in a clockwise direction. This stops the flow of grain from feeder hopper 55 to rotatable hopper 21, thereby allowing the grain weighed in rotatable hopper 21 to rotate about axle 22 of rotatable hopper 21 until it is dumped out of rotatable hopper 21 and allowed to flow out of outer casing 14 through the funnel shaped section 19 and its depending cylindrical section 20, to a bag, conveyor, or the like (not shown).

As rotatable hopper 21 rotates in this manner, another positioning arm 40a–c engages the roller 76 of actuating lever 64 to pivot it in a counterclockwise direction so that its projection 66 again abuts holding lever 63 to pivot shaft 61, thereby opening feeder hopper 55. As the positioning arm 40a–c completes its movement to its vertical position, it engages stop lever 49 at a substantial velocity; however, cushions 46 of stop lever 49 decelerate hopper 23 and return the positioning arm to a vertical position and hold down link 110 prevents stop lever 49 from inadvertently bouncing in an upward direction. When the rotatable hopper 21 comes to a complete stop, the spring of cushions 47 urges stop lever 49 and positioning arm back to the position as shown in FIG. 1, where stop lever 48 prevents backward movement of hopper 23. As the positioning arm 40a–c traveled past stop lever 48, it pivoted stop lever 48 about its bumper link 46 until positioning arm 40a–c had moved from under stop lever 48, whereupon stop lever 48 dropped to trap the positioning arm between stop levers 48 and 49.

As positioning arm 40a–c moved past actuating lever 64 and shaft 61 was rotated in a counterclockwise direction, holding lever 63 was also rotated so that its projection 68 moved above catch lever 60, whereupon catch lever 70 took the position as shown in FIG. 2 under the bias of its spring 72. Thus, rotatable shaft 61 was prevented from rotating in a clockwise direction until one of the sections 24a–c of hopper 23 had been filled with enough grain from the feeder hopper to tilt the balance arm 29, as previously described.

When it is desired to stop the dispensing function of the apparatus, hand lever 95 is pivoted until its projection 98 engages one of the positioning arms 40a–c, whereupon rotation of the rotatable hopper is terminated.

The substance being dispensed from hopper 21 is poured down the side of casing 14 and it flows through only a portion of the area defined by cylindrical portion 20 of casing 14, leaving the remaining area open for the flow of air. As the substance flows from hopper 21 through cylindrical portion 20 of casing 14, a slight vacuum is created in casing 14 which induces a flow of air through cylindrical portion 20 into casing 14. Thus, any air that might be present in a bag being filled at cylindrical portion 20 tends to pass into casing 14 and the dust that might accompanying the bag filling operation is ducted back into casing 14.

It should be understood that the weight of the grain being dispensed by the weighing and dispensing apparatus can be varied by movement of sliding weight 36 on its weight support arm 34, or removal of stationary weights 35 from rib 33. Furthermore, while the invention has been disclosed as weighing and dispensing grain, it should be understood that any granular free-flowing substance can be dispensed by the instant invention. The flow characteristics of the substance being dispensed can be compensated for by the choking mechanism 85 by moving inner tube 86 toward or away from the opening 58 of feeder hopper 55 so as to further choke or to open opening 58. Also, if the operator desires to make temporary adjustments of the degree of choke of the choking mechanism, he can move the lever 96 of adjusting mechanism 95 about its pivot pin 98 to adjust the depth of the choking mechanism within the feeder hopper 55

It should be noted that opening 58 of the feeder hopper is slanted so that the movement of feeder valve 56 about its pivot pins 59 which are offset from the center of feeder hopper 55 will form a tight fit about the opening 58. Furthermore, when the feeder valve 56 is moved from its closed position to its open position, the grain resting thereon will tend to pour off the arcuate surface of the feeder valve 56 so that it is not dumped as a single body into the rotatable hopper 21. This prevents the feed resting on the feeder valve 56 from bouncing the balance arm 29 of the weighing mechanism 30 and causing a premature rotation of rotatable feeder hopper 21.

It should further be noted that the pivot pin 31 of balance arm 29 of the weighing mechanism 30 is positioned below the axle 22 of rotatable hopper 21 and the center of gravity of the weights 35 and 36. Thus, when balance arm 29 rotates in a counterclockwise direction, the horizontal distance between axle 22 and pivot pin 31 will lengthen while the horizontal distance between the center of gravity of weights 35 and 36 and pivot pin 31 will shorten, thereby causing the rotatable hopper 21 to drop rather abruptly when the correct weight is reached within the section in registration with feeder hopper 55. This aids in the fast movement of the weighing and dispensing apparatus so that feeder hopper 21 will not linger in a balanced position.

With this construction, it can be seen that an entirely automatic weighing and dispensing apparatus has been disclosed. Furthermore, it will be noted that the speed of operation is quite fast when compared with devices of this nature that were formerly used. Also, the construction of the weighing mechanism is such that an abrupt and positive movement is made when the appropriate amount of grain has been deposited in the section of the rotatable hopper receiving grain, thereby causing the device to accurately weigh the grain and immediately begin its dispensing function upon receiving the proper weight of grain. Cushions 47 of the apparatus also absorbs the shocks that might be encountered in the apparatus upon such abrupt and positive movements. Thus, the vibrations and surges of the decelerating rotatable hopper 21 that might otherwise be encountered are eliminated.

It will be obvious to those skilled in the art that many variations may be made in the embodiment chosen for the purpose of illustrating the present invention without departing from the scope thereof as defined by the appended claims.

What is claimed as invention is:

1. Apparatus for controlling the flow of a grainy substance comprising a feed hopper defining an opening at its lower end, a flow control member positioned inside said hopper over said opening comprising an upwardly extending open ended tubular member having a pair of downwardly and outwardly tapered wings connected thereto at its lower end, the opening of the lower end of the tubular member being positioned over the opening at the lower end of the hopper, and the opening of the upper end of the tubular member being positioned above the hopper, and a valve member including a closing surface pivotally connected to said hopper at a point positioned on one side of the center line of said opening and arranged to move to the other side of the center line of said opening to open said opening.

2. Apparatus for controlling the flow of a grainy substance comprising a feed hopper defining an opening at its lower end, a flow control member positioned inside said hopper over said opening comprising an upwardly extending open ended tubular member having a pair of downwardly and outwardly tapered wings connected thereto at its lower end, the opening of the lower end of the tubular member being positioned over the opening at the lower end of the hopper, and the opening of the upper end of the tubular member being positioned above the hopper, and a rotatable hopper disposed below said feed hopper and means responsive to the rotation of said rotatable hopper for opening and closing of said feed hopper.

3. Apparatus for controlling the flow of a grainy substance comprising a feed hopper defining an opening at its lower end, a flow control member positioned inside said hopper over said opening comprising an upwardly extending open ended tubular member having a pair of downwardly and outwardly tapered wings connected thereto at its lower end, the opening of the lower end of the tubular member being positioned over the opening at the lower end of the hopper, and the opening of the upper end of the tubular member being positioned above the hopper, and a rotatable hopper disposed below said feed hopper and means responsive to the weight of any grainy substance in said rotatable hopper for opening or closing (and) the opening of said feed hopper.

4. Apparatus for dispensing a predetermined weight of substance comprising
 a laterally extending balancing arm pivotally mounted intermediate its ends on a fulcrum,
 a rotatable hopper rotatably mounted on one end of said balancing arm at a point above said fulcrum and defining a plurality of receiving chambers therein,
 a weight supported on the other end of said balancing arm arranged to move over at least a portion of said arm,
 a feed hopper positioned above said rotatable hopper and arranged to feed substance to said rotatable hopper, and
 means responsive to the weight of substance present in said rotatable hopper for interrupting the feed of substance to said rotatable hopper.

5. The invention of claim 4 wherein said feed hopper defines an opening at its lower portion positioned over said rotatable hopper, and a valve member movable over said opening to close said opening in response to the weight of substance in said rotatable hopper.

6. The invention of claim 5 wherein said rotatable hopper has connected thereto a positioning member for each of said receiving chambers, a pivotal shaft, an actuating lever connected to said pivotal shaft and extending toward the path of travel of said positioning members so that rotation of said rotatable hopper causes said positioning members to engage said actuating lever to pivot said pivotal shaft, a valve actuating linkage connected between said valve member and said pivotal shaft whereby the pivoting of said shaft causes movement of said valve member to open and close the opening of said feed hopper.

7. The invention of claim 4 wherein said rotatable hopper comprises a positioning member attached thereto for each receiving chamber, a stop member positioned to engage said positioning members to stop the rotation of said rotatable hopper when less than a predetermined weight of substance is present in said rotatable hopper.

8. Apparatus for dispensing predetermined weights of substance comprising:
 a balancing arm pivotally supported intermediate its ends,
 a weight member slidably supported on one end of said balancing arm,
 a rotatable hopper rotatably supported at the other end of said balancing arm and defining a plurality of receiving chambers equally spaced therein,
 a feed hopper positioned above said rotatable hopper and arranged to feed the substance to the chambers of said rotatable hopper,
 a valve member for interrupting the feeding of substance from said feed hopper to said rotatable hopper,
 an actuating member connected to said valve member for opening said valve member in response to the rotation of said rotatable hopper,
 holding means for holding said valve member in its opened position, and
 releasing means for withdrawing said holding means.

9. The invention of claim 8 wherein said rotatable hopper is normally supported at a point above the pivotal support of said balancing arm so that downward movement of said rotatable hopper about said pivotal support lengthens the lateral distance between the pivotal support and the point of support of said rotatable hopper.

10. The invention of claim 8 and further including a positioning member attached to said rotatable hopper for each of said receiving chambers, said actuating member comprising a lever having one of its ends extending in the path of travel of said positioning members and the other of its ends rigidly connected to a pivotal member, said valve member including linkage means connected to said pivotal member, a said linkage means being constructed and arranged to open said valve in response to the pivoting of said pivotal member, said holding means comprising an extension rigidly connected to said pivotal member and a ratchet member biased toward said extension to engage said extension, said releasing means comprising a releasing link connected between said balancing arm and said ratchet member arranged to withdraw said releasing link from said ratchet member when a predetermined weight of substance is present in one of said receiving chambers.

11. The invention of claim 8 and further including at least one positioning member attached to said rotatable hopper, and a stop member positioned with respect to said rotatable hopper to engage said positioning member when the weight of the substance in said rotatable hopper is less than a predetermined amount and to disengage said positioning member when the weight of the substance in said rotatable hopper is more than a predetermined amount.

12. The invention of claim 11 wherein said stop member includes a lever arm and resilient means adjacent said lever arm to limit its movement.

13. The invention of claim 8 wherein said valve member is urged by gravity toward its closed position.

14. A method of dispensing a predetermined weight of substance from a feed hopper including a shut-off valve, through a rotatable hopper having a plurality of receiving chambers therein comprising:
 rotating a chamber of the rotatable hopper in a first direction toward a position below the feed hopper,
 gradually opening the shut-off valve to feed substance from the feed hopper to the rotatable hopper,
 locking the shut-off valve in its fully open position,
 stopping the rotation of the rotatable hopper when one of its chambers has moved slightly beyond its receiving position,
 rotating the rotatable hopper in the opposite direction until its receiving chamber is in its receiving position,
 abruptly closing the shut-off valve when a predetermined weight of substance has been fed from the feed hopper to the rotatable hopper, rotating the rotatable hopper in the first direction, and dispensing the substance from the chamber of the rotatable hopper.

References Cited

UNITED STATES PATENTS

| | | | |
|---|---|---|---|
| 1,089,947 | 3/1914 | Nims | 222—368 X |
| 1,449,571 | 3/1923 | Younger | 222—246 |
| 445,958 | 2/1891 | Lockwood | 222—234 X |
| 980,918 | 1/1911 | Brousseau | 222—564 X |
| 1,736,673 | 11/1929 | Smith | 222—509 X |
| 2,714,472 | 8/1955 | Richardson | 222—63 |
| 2,882,937 | 4/1959 | Kay | 222—55 X |
| 3,097,711 | 7/1963 | Clark | 222—556 X |

STANLEY H. TOLLBERG, *Primary Examiner.*

U.S. Cl. X.R.

222—368